United States Patent
Jung et al.

(10) Patent No.: US 9,209,428 B2
(45) Date of Patent: Dec. 8, 2015

(54) SECONDARY BATTERY HAVING IMPROVED SAFETY BY DEFORMATION OF ELECTRODE ASSEMBLY-RECEIVING PORTION IN CASE

(75) Inventors: Hyun-Chul Jung, Incheon (KR); Hyang Mok Lee, Seoul (KR); Byungjin Choi, Daejeon (KR); Jun Hwan Jang, Seoul (KR); JeongSam Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1000 days.

(21) Appl. No.: 12/513,625

(22) PCT Filed: Oct. 31, 2007

(86) PCT No.: PCT/KR2007/005432
§ 371 (c)(1),
(2), (4) Date: Feb. 12, 2010

(87) PCT Pub. No.: WO2008/056908
PCT Pub. Date: May 15, 2008

(65) Prior Publication Data
US 2010/0143787 A1    Jun. 10, 2010

(30) Foreign Application Priority Data
Nov. 6, 2006    (KR) .................. 10-2006-0108642

(51) Int. Cl.
*H01M 2/02* (2006.01)
*H01M 10/0525* (2010.01)

(52) U.S. Cl.
CPC ............ *H01M 2/021* (2013.01); *H01M 2/0275* (2013.01); *H01M 2/0287* (2013.01); *H01M 10/0525* (2013.01)

(58) Field of Classification Search
None
See application file for complete search history.

(56) References Cited

U.S. PATENT DOCUMENTS

| 6,242,130 B1 | 6/2001 | Noh et al. |
| 6,296,971 B1 | 10/2001 | Hara |

(Continued)

FOREIGN PATENT DOCUMENTS

| JP | 2001-52659 A | 2/2001 |
| JP | 2001-84971 A | 3/2001 |

(Continued)

*Primary Examiner* — Ula C Ruddock
*Assistant Examiner* — Tony Chuo
(74) *Attorney, Agent, or Firm* — Birch, Stewart, Kolasch & Birch, LLP

(57) ABSTRACT

Disclosed herein is a secondary battery constructed in a structure in which pluralities of electrode tabs, protruding from an electrode assembly, are connected to corresponding electrode leads, and the electrode assembly is mounted in a receiving part, wherein a battery case is multi-formed, such that the battery case presses the upper end of the electrode assembly by a predetermined width, thereby preventing the upward movement of the electrode assembly, mounted in the receiving part, at the upper end space region of the receiving part, where the electrode assembly is spaced apart from the upper end of the receiving part, for the connection between the electrode tabs and the corresponding electrode leads, during the repetitive charge and discharge of the battery. Consequently, it is possible to prevent the occurrence of a short circuit of the battery due to external impacts, such as the dropping of the battery, and to prevent the occurrence of an internal short circuit of the battery due to the expansion of the battery case caused by the repetitive charge and discharge of the battery, whereby the safety of the secondary battery is improved.

11 Claims, 6 Drawing Sheets

(56) References Cited

U.S. PATENT DOCUMENTS

| | | | |
|---|---|---|---|
| 6,743,546 B1 * | 6/2004 | Kaneda et al. | 429/127 |
| 2002/0182494 A1 * | 12/2002 | Hayashi et al. | 429/185 |
| 2003/0049527 A1 * | 3/2003 | Yageta et al. | 429/179 |
| 2003/0054241 A1 | 3/2003 | Yamashita et al. | |
| 2008/0057384 A1 * | 3/2008 | Jang et al. | 429/129 |

FOREIGN PATENT DOCUMENTS

| | | |
|---|---|---|
| JP | 2004-342449 A | 12/2004 |
| JP | 2005-116482 A | 4/2005 |
| JP | 2006-253060 A | 9/2006 |
| KR | 20-0207948 Y1 | 4/2000 |
| KR | 10-0497147 B1 | 8/2001 |
| KR | 10-0515571 B1 | 8/2001 |
| KR | 10-0515572 B1 | 8/2001 |
| KR | 10-2006-0072922 A | 6/2006 |
| TW | 531060 | 5/2003 |
| TW | 1230479 | 4/2005 |
| WF | 2004/045006 A1 | 5/2004 |
| WO | 00/59063 A1 | 10/2000 |

* cited by examiner

PRIOR ART

PRIOR ART

PRIOR ART

SECONDARY BATTERY HAVING IMPROVED SAFETY BY DEFORMATION OF ELECTRODE ASSEMBLY-RECEIVING PORTION IN CASE

FIELD OF THE INVENTION

The present invention relates to a secondary battery having improved safety by deformation of an electrode assembly receiving part of a battery case, and, more particularly, to a secondary battery constructed in a structure in which pluralities of electrode tabs, protruding from an electrode assembly, are connected to corresponding electrode leads, and the electrode assembly is mounted in a receiving part, wherein a battery case is multi-formed, such that the battery case presses the upper end of the electrode assembly by a predetermined width, thereby preventing the upward movement of the electrode assembly, mounted in the receiving part, at the upper end space region of the receiving part, where the electrode assembly is spaced apart from the upper end of the receiving part, for the connection between the electrode tabs and the corresponding electrode leads, during the repetitive charge and discharge of the battery.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having a high energy density, a high discharge voltage, and a high power stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are sequentially stacked while separators are disposed respectively between the cathodes and the anodes, or a stacking/folding type structure in which pluralities of cathodes and anodes having a predetermined size are sequentially stacked while separators are disposed respectively between the cathodes and the anodes to constitute a bi-cell or a full-cell, and then the bi-cell or the full-cell is wound.

Recently, much interest has been taken in a pouch-shaped battery constructed in a structure in which such a stacking or stacking/folding type electrode assembly is mounted in a pouch-shaped battery case made of an aluminum laminate sheet because of low manufacturing costs, light weight, and easy modification in shape. As a result, the use of the pouch-shaped battery has gradually increased.

FIG. 1 is an exploded perspective view typically illustrating the general structure of a conventional representative pouch-shaped secondary battery.

Referring to FIG. 1, the pouch-shaped secondary battery 10 includes an electrode assembly 30, pluralities of electrode tabs 40 and 50 extending from the electrode assembly 30, electrode leads 60 and 70 welded to the electrode tabs 40 and 50, respectively, and a battery case 20 for receiving the electrode assembly 30.

The electrode assembly 30 is a power generating element comprising cathodes and anodes sequentially stacked while separators are disposed respectively between the cathodes and the anodes. The electrode assembly 30 is constructed in a stacking structure or a stacking/folding structure. The electrode tabs 40 and 50 extend from corresponding electrode plates of the electrode assembly 30. The electrode leads 60 and 70 are electrically connected to the electrode tabs 40 and 50, extending from the corresponding electrode plates of the electrode assembly 30, respectively, for example, by welding. The electrode leads 60 and 70 are partially exposed to the outside of the battery case 20. To the upper and lower surfaces of the electrode leads 60 and 70 are partially attached insulative films 80 for improving sealability between the battery case 20 and the electrode leads 60 and 70 and, at the same time, for securing electrical insulation between the battery case 20 and the electrode leads 60 and 70.

The battery case 20 is made of an aluminum laminate sheet. The battery case 20 has a space defined therein for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced a predetermined distance from the electrode assembly 30 such that the plurality of cathode tabs 40 and the plurality of anode tabs 50 can be coupled to the electrode leads 60 and 70, respectively.

FIG. 2 is a partially enlarged view illustrating the inner upper end of the battery case of the secondary battery shown in FIG. 1, in which the cathode tabs are coupled to each other in a concentrated state and connected to the cathode lead, and FIG. 3 is a front see-through view illustrating the secondary battery of FIG. 1 in an assembled state.

Referring to these drawings, the plurality of cathode tabs 40, which extend from cathode collectors 41 of the electrode assembly 30, are connected to one end of the cathode lead 60, for example, in the form of a welded bunch constituted by integrally combining the cathode tabs 40 with each other by welding. The cathode lead 60 is sealed by the battery case 20 while the other end 61 of the cathode lead 60 is exposed to the outside of the battery case 20. Since the plurality of cathode tabs 40 are integrally combined with each other to constitute the welded bunch, the inner upper end of the battery case 20 is spaced a predetermined distance $L_1$ from the upper end surface of the electrode assembly 30, and the cathode tabs 40 combined in the form of the welded bunch are bent approximately in the shape of a V. Accordingly, the coupling regions between the electrode tabs and the corresponding electrode leads may be referred to as "V-form regions."

However, such V-form regions have a problem in the aspect of safety of the battery. Specifically, when the battery drops with the upper end of the battery, i.e., the cathode lead 60 of the battery, down, or an external physical force is applied to the upper end of the battery, the electrode assembly 30 moves toward the inner upper end of the battery case 20, or the upper end of the battery case 20 is crushed. As a result, anodes (not shown) of the electrode assembly 30 are brought into contact with the cathode tabs 42 or the cathode lead 60, and therefore, a short circuit may occur inside the battery. Consequently, the safety of the battery is greatly lowered.

As an example of a technology for preventing the occurrence of such an internal short circuit of the battery, Korean Utility Model Registration No. 0207948 discloses a lithium ion polymer battery including a battery case for receiving a battery cell and electrode tabs, the battery case being constructed in a structure in which the battery case wraps the battery cell and the electrode tabs in a sealing fashion and sides of the battery case are inclined such that the area of the battery case is increased from the bottom to the top of the battery case, wherein cathode plates, anode plates, and separators, included in the battery cell, are formed with different sizes such that the cathode plates, the anode plates, and the separators are located adjacent to the inner parts of the inclined sides of the battery case. However, this technology has a drawback in that it is required to manufacture the cathode plates, the anode plates, and the separators with different sizes, whereby the manufacturing process is complicated, and the costs of equipment are increased. For this reason, this technology has no practical use.

Also, Japanese Patent Application Publication No. 2001-052659 discloses a stacking type polymer electrolyte battery characterized in that, at a region where electrode terminals are received, the depth of a sheathing container is gradually decreased outward from a region where an electrode assembly is received. However, this technology has a drawback in that a contact region between the electrode assembly and a battery case is loosened due to the expansion and contraction of the battery case caused by the repetitive charge and discharge of the battery, and therefore, when external impacts are applied to the battery in this state, a short circuit may occur in the battery.

In addition, Japanese Patent Application Publication No. 2005-116482 discloses a thin battery including an sheathing member which has a flat surface previously formed at a region where an electrode assembly is received and an inclined surface previously formed between the flat surface and the outer circumferential surface of the sheathing member, thereby accomplishing uniform surface pressure distribution and reducing the volume of the battery. However, this technology still has the above-mentioned drawback.

Consequently, there is a high necessity for a technology that is capable of not only preventing the occurrence of an internal short circuit of a battery due to the dropping of the battery or the application of an external force to the battery but also preventing the occurrence of an internal short circuit of the battery even when the battery case somewhat swells due to the repetitive charge and discharge of the battery.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a battery case is multi-formed, such that the battery case presses the upper end of an electrode assembly by a predetermined width, it is possible to prevent the occurrence of an internal short circuit of the battery due to external impacts, such as the dropping of the battery, and, in addition, to prevent the occurrence of an internal short circuit of the battery due to external impacts even when the battery case somewhat swells due to the repetitive charge and discharge of the battery, whereby the safety of the secondary battery is improved. The present invention has been completed based on these findings.

In accordance with one aspect of the present invention, the above and other objects can be accomplished by the provision of a secondary battery constructed in a structure in which pluralities of electrode tabs, protruding from an electrode assembly, are connected to corresponding electrode leads, and the electrode assembly is mounted in a receiving part, wherein a battery case is multi-formed, such that the battery case presses the upper end of the electrode assembly by a predetermined width, thereby preventing the upward movement of the electrode assembly, mounted in the receiving part, at the upper end space region of the receiving part, where the electrode assembly is spaced apart from the upper end of the receiving part, for the connection between the electrode tabs and the corresponding electrode leads, during the repetitive charge and discharge of the battery.

The internal short circuit of a battery due to the dropping of the battery or the application of external impact to the battery may act as a principal cause of explosion or combustion of the battery. This is because the electrode assembly moves, when the battery drops or the external impact is applied to the battery, with the result that the cathodes and the anodes of the electrode assembly are brought into contact with each other, and therefore, high resistance heat is generated due to conducting current in the contact resistance portions. When the interior temperature of the battery exceeds a critical temperature level due to the resistance heat, the oxide structure of a cathode active material collapses, and therefore, a thermal runaway phenomenon occurs. As a result, the battery may catch fire or explode.

In the secondary battery according to the present invention, on the other hand, the battery case is multi-formed, and therefore, the electrode assembly is mounted in the battery case while the electrode assembly is stably located in position. Consequently, even when the battery drops or an external force is applied to the battery, or even when the battery case swells (expands) due to the repetitive charge and discharge of the battery, the upward movement of the electrode assembly is prevented, and therefore, the occurrence of an internal short circuit of the battery is prevented.

Specifically, the secondary battery according to the present invention is characterized in that the battery case is multi-formed. Here, the 'multi-form structure' is a structure in which the receiving part for receiving the electrode assembly is formed in the battery case, and the receiving part is deformed to press the upper end of the electrode assembly by a predetermined width. Specifically, the multi-form structure is a structure in which the receiving part is inclined downward from a position spaced apart downward, by a predetermined length, from the upper end of the electrode assembly, such that the multi-form structure presses the upper end of the electrode assembly by a predetermined width. Consequently, a 'multi-form region,' which is used in this specification, is an inclined region of the receiving part starting from a position spaced apart downward, by a predetermined length, from the upper end of the electrode assembly. According to circumstances, the inclined region may be a two- or multi-step region.

By the multi-form region, the upper end of the electrode assembly is fixed in the battery case. Consequently, even when the gap between the battery case and the electrode assembly is increased due to the repetitive expansion and contraction of the battery case by the repetitive charge and discharge of the battery, it is possible to prevent the movement of the electrode assembly due to the dropping of the battery. As a result, the safety of the battery is improved.

In a preferred embodiment, the upper end space region of the receiving part is inclined (an 'inclined part') such that the width of the upper end space region of the receiving part is at least partially decreased toward the upper end of the battery case (toward the electrode terminals), and a multi-form region to press the upper end of the electrode assembly is successively formed such that the inclined part is followed by the multi-form region. The inclined part is formed at the upper end surface of the battery case receiving part, and the multi-form region is successively formed such that the inclined part is followed by the multi-form region. Consequently, the inclined part and the multi-form region form a two-step inclination structure. With the two-step inclination structure, the upper end space region is effectively reduced, and, at the same time, the upper end of the electrode assembly is pressed. Consequently, the two-step inclination structure effectively corresponds to the deformation or expansion of the battery case due to the charge and discharge of the battery.

The multi-form region has an inclination angle sufficient to press the upper end of the electrode assembly even when the battery case expands due to the repetitive charge and discharge of the battery. Preferably, the multi-form region has an inclination angle of 5 to 20 degrees within the range less than that of the inclined part.

Meanwhile, the inclination angle of the inclined part is not particularly restricted so long as the upper end space region is reduced, and therefore, the upward movement of the electrode assembly, mounted in the receiving part, is prevented. For example, the inclined part may have an inclination angle approximately corresponding to the inclination angle formed by the electrode tabs such that the inclined part approximately coincides with the outer shape of a welded bunch constituted by integrally combining the electrode tabs with each other by welding. Preferably, therefore, the inclined part has an inclination angle greater by at least 10 degrees than that of the multi-form region.

Preferably, the multi-form region starts from a position corresponding to 5 to 15% of the total length of the electrode assembly from the upper end of the electrode assembly. Specifically, the multi-form region starts from a position spaced apart from the upper end of the electrode assembly by 3 to 20 mm.

When the multi-form region starts from a too small percentage of the total length of the electrode assembly, or the inclination angle of the multi-form region is too small, it is not possible for the multi-form region to effectively press the electrode assembly. When the multi-form region starts from a too large percentage of the total length of the electrode assembly, or the inclination angle of the multi-form region is too large, on the other hand, the multi-form region excessively presses the electrode assembly. As a result, the electrode plates and the battery case may be damaged. Furthermore, internal resistance may increase.

Preferably, the multi-form region is formed simultaneously with the formation of the inclined part, when the receiving part of the battery case is formed, during the molding of the battery case, such that the electrode assembly is effectively pressed by the multi-form region. This is because, when the multi-form region is formed as a post-treatment process after the battery is manufactured through the reception of the electrode assembly in the receiving part and the sealing of the battery case, the multi-form region may be restored to its original state during the use of the battery.

In a preferred embodiment, the upper end surface of the electrode assembly receiving part is bent toward the electrode assembly, thereby minimizing a possibility of a short circuit occurring due to the bending and tight contact at the electrode tab connection regions.

By such bending, a step is formed at the upper end of the receiving part of the battery case, with the result that a two-step region is formed together with the multi-form region. Consequently, no dead space exists in the battery case, or the dead space in the battery case is minimized, and therefore, the battery is constructed in a more compact structure. Also, a protrusion is formed between the upper end of the receiving part and the multi-form region, by the bending. As a result, the upper end of the electrode assembly is brought into tight contact with the inner surface of the battery case, and therefore, when impacts are applied to the upper end region of the battery, especially the corners of the battery, due to the dropping of the battery, the battery is doubly protected, whereby the safety of the battery is greatly improved. Furthermore, the inclination degree of the multi-form region is lowered, and therefore, when external impacts are applied to the battery, the impacts are effectively absorbed by the multi-form region.

The bent part may be formed as a post-treatment process after the reception of the electrode assembly in the receiving part and the sealing of the battery case. Alternatively, the bent part may be formed simultaneously with the formation of the receiving part during the manufacture of the battery case. In the former case, the post-treatment process may be carried out manually or automatically by a machine.

The electrode assembly is not particularly restricted so long as pluralities of electrode tabs are connected with each other to constitute cathodes and anodes. Preferably, the electrode assembly is constructed in a stacking structure and/or a stacking/folding structure. The details of an electrode assembly constructed in such a stacking/folding structure are disclosed in Korean Patent Application Publication No. 2001-0082058, No. 2001-0082059, and No. 2001-0082060, which have been filed in the name of the applicant of the present application. The disclosure of the above-mentioned patent publications is hereby incorporated by reference.

In the secondary battery according to the present invention, the battery case is preferably made of a laminate sheet including a metal layer and a resin layer. Specifically, the battery case may be a pouch-shaped battery case, made of an aluminum laminate sheet, having a receiving part for receiving the electrode assembly. The battery case, made of the laminate sheet, is sealed, for example, by thermal welding after the electrode assembly is mounted in the receiving part of the battery case.

Preferably, the secondary battery according to the present invention is a lithium secondary battery. Especially, the present invention is preferably applied to a so-called lithium-ion polymer battery in which the electrode assembly is impregnated with a lithium-contained electrolyte in a gel phase.

Also, the secondary battery according to the present invention is preferably used as a unit cell of a middle- or large-sized battery pack having high power and large capacity. The unit cell of the middle- or large-sized battery pack has a size greater than that of the unit cell of a small-sized battery pack. Consequently, the volume change of the unit cell of the middle- or large-sized battery pack is great during the charge and discharge of the unit cell, and a possibility of the unit cell catching fire due to gas generated by an internal short circuit of the unit cell or the degradation of the battery components is very strong. According to the secondary battery according to the present invention, on the other hand, the safety of the secondary battery is very high by virtue of the inclined part formed at the battery case.

In accordance with another aspect of the present invention, there is provided a middle- or large-sized battery pack including the above-described secondary battery as a unit cell.

A method of manufacturing a middle- or large-sized battery pack using the secondary battery according to the present invention as a unit cell is well known in the art to which the present invention pertains. For example, Korean Patent Application No. 2004-111699, which has been filed in the name of the applicant of the present application, discloses a battery pack manufactured using a plurality of cartridges. The disclosure of this patent application is hereby incorporated by reference.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
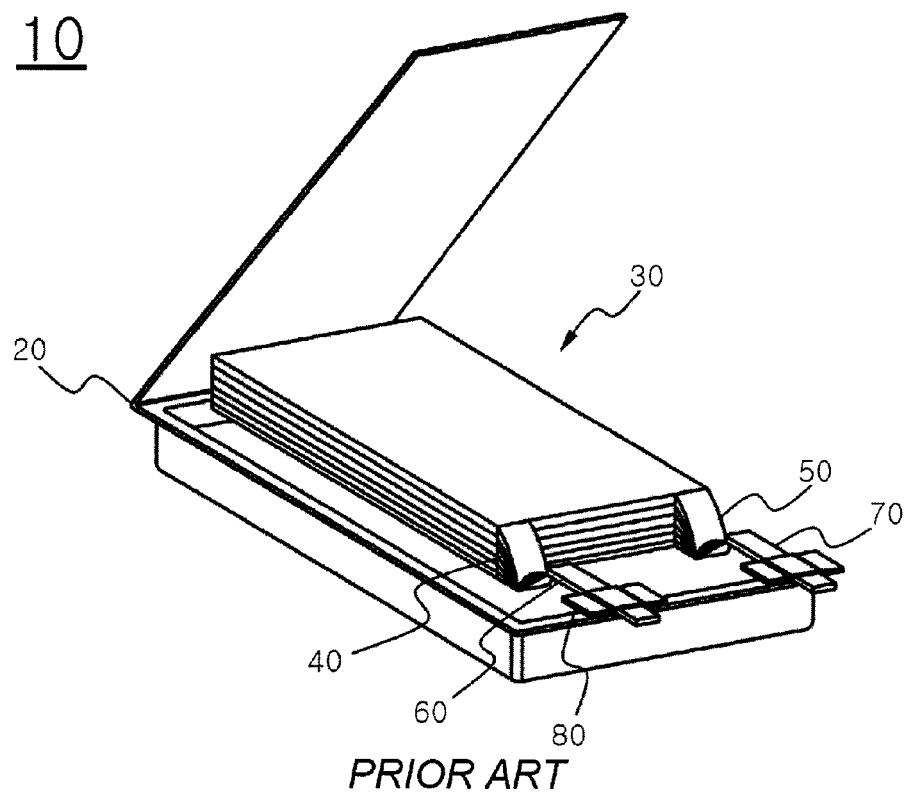
FIG. 1 is an exploded perspective view illustrating the general structure of a conventional pouch-shaped secondary battery.
Figure 2:
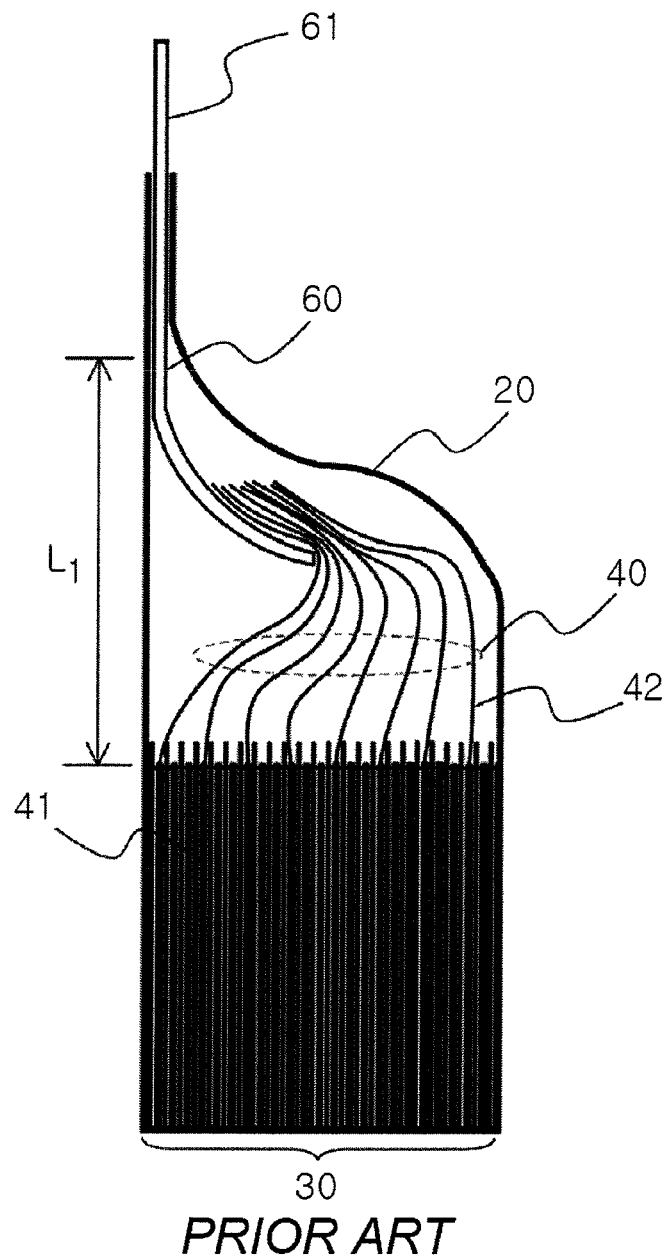
FIG. 2 is a partially enlarged view illustrating the inner upper end of a battery case of the secondary battery shown in FIG. 1, in which cathode tabs are coupled to each other in a concentrated state and connected to a cathode lead.
Figure 3:
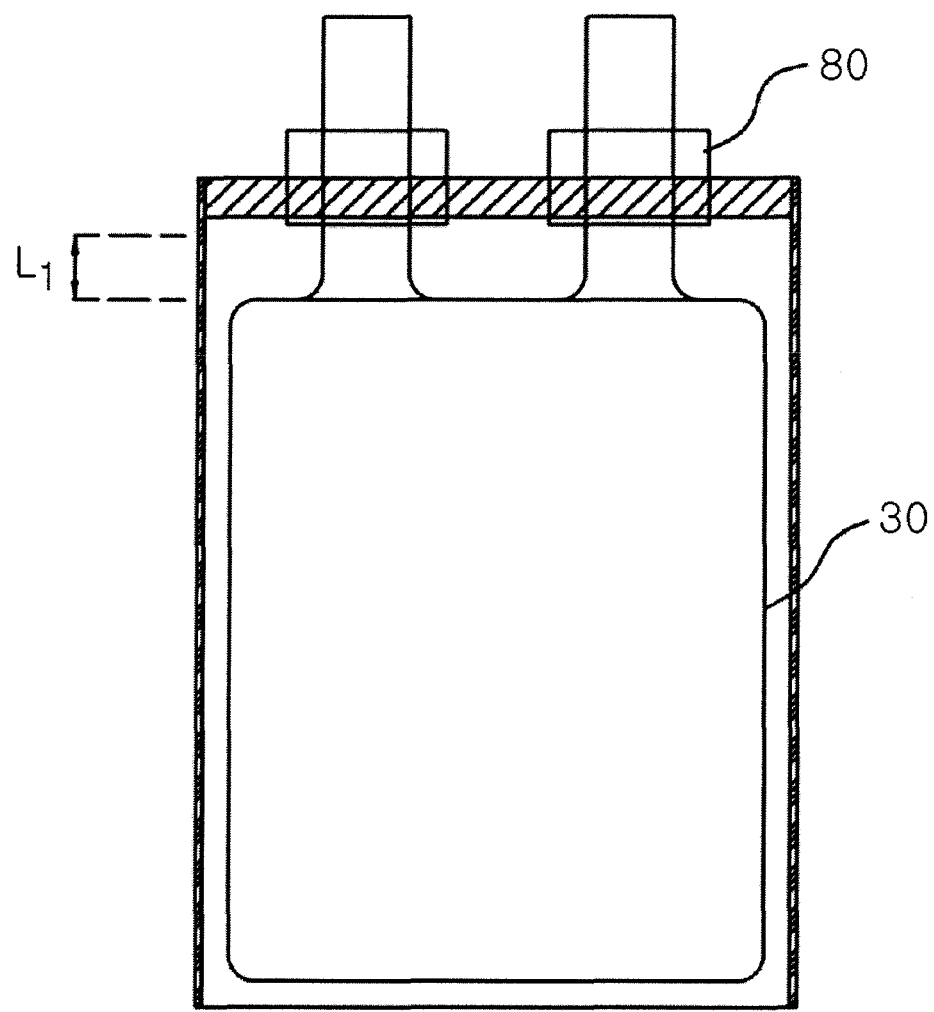
FIG. 3 is a front see-through view illustrating the secondary battery of FIG. 1 in an assembled state.
Figure 4:
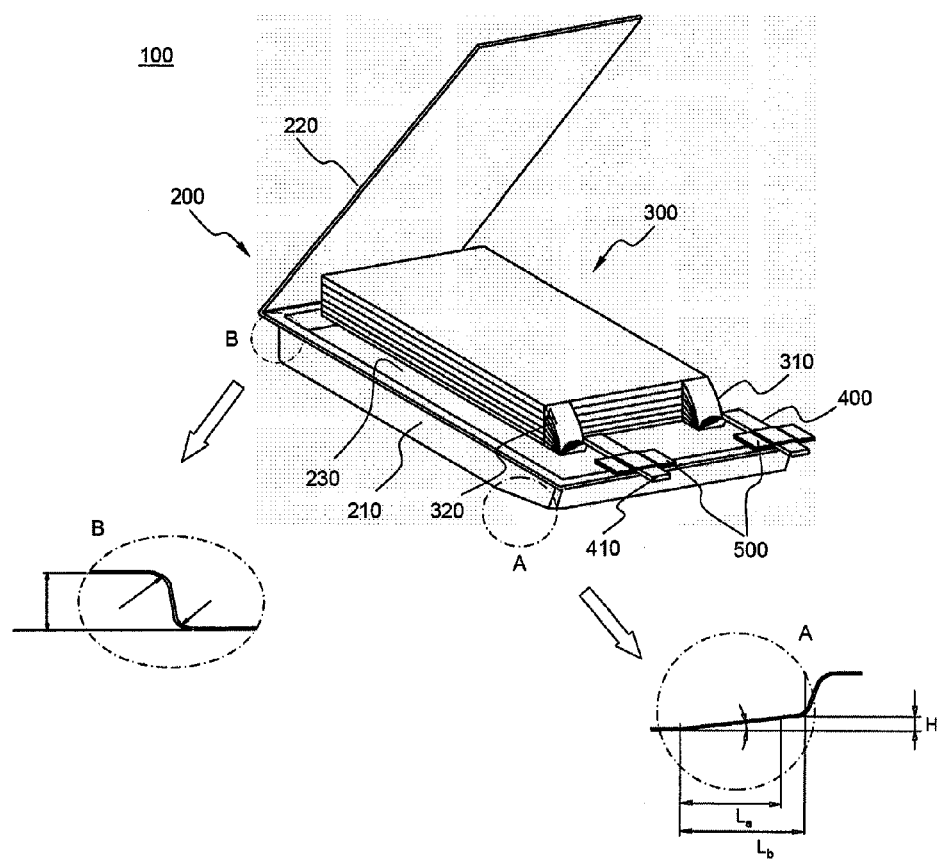
FIG. 4 is an exploded perspective view illustrating a pouch-shaped secondary battery according to a preferred embodiment of the present invention.

FIG. 4 is an exploded perspective view illustrating a pouch-shaped secondary battery according to a preferred embodiment of the present invention.

Referring to FIG. 4, the pouch-shaped secondary battery 100 includes an electrode assembly 300, cathode and anode tabs 310 and 320 extending from the electrode assembly 300, electrode leads 400 and 410 welded to the cathode and anode tabs 310 and 320, respectively, and a battery case 200 for receiving the electrode assembly 300.

The electrode assembly 300 is a power generating element comprising cathodes and anodes sequentially stacked while separators are disposed respectively between the cathodes and the anodes. The electrode assembly 30 is constructed in a stacking structure or a stacking/folding structure. The cathode and anode tabs 310 and 320 extend from corresponding electrode plates of the electrode assembly 300. The electrode leads 400 and 410 are electrically connected to the cathode and anode tabs 310 and 320, extending from the corresponding electrode plates of the electrode assembly 300, respectively, for example, by welding. The electrode leads 400 and 410 are partially exposed to the outside of the battery case 200. Also, insulative films 500 are attached to the upper and lower surfaces of the electrode leads 400 and 410 to prevent the occurrence of a short circuit between a heat welding machine and the electrode leads 400 and 410, when the residue portion of a case body 210 and a cover 220 are thermally welded to each other by the heat welding machine, and to secure the sealability between the electrode leads 400 and 410 and the battery case 200.

Generally, the battery case 200 is made of an aluminum laminate sheet. The battery case 200 includes a case body 210 having a concave-shaped receiving part 230 for receiving the electrode assembly 300 and a cover 220 integrally connected to the case body 210.

When viewing a view illustrating the lower end of the receiving part 230, indicated by reference symbol B, the lower end of the receiving part 230 is formed in a shape approximately coinciding with the shape of the lower end of the electrode assembly 300. That is, the lower end of the receiving part 230 has an inclination degree of approximately a right angle.

On the other hand, the upper end space region of the receiving part 230 is inclined such that the width of the upper end space region of the receiving part 230 is decreased toward the upper end of the case body 210. In addition, a multi-form region, indicated by reference symbol A, is formed at the case body 210 at the upper end space region of the receiving part 230. Consequently, the upward movement of the electrode assembly 300, mounted in the receiving part 230, is prevented, and, at the same time, the occurrence of a short circuit due to the expansion of the battery case caused by the repetitive charge and discharge of the battery is prevented.

When viewing an enlarged view illustrating the multi-form region A, the multi-form region A is formed such that the multi-form region A has a total length $L_b$ from a position where the case body 210 is spaced downward from the upper end of the electrode assembly 300 by a predetermined length $L_a$. As a result, when the electrode assembly 300 is mounted in the receiving part 230, the multi-form region A applies a predetermined pressure to the upper end of the electrode assembly 300. Consequently, the movement of the electrode assembly 300 is prevented even when the battery case 200 expands due to the repetitive charge and discharge of the battery. Specifically, the multi-form region A is formed at a predetermined angle at which the electrode assembly 300 has a height H and the length $L_a$ at the upper end thereof such that excellent battery performance is maintained in a state in which the electrode assembly 300 is mounted in the receiving part, while the multi-form region A sufficiently applies a pressure to the upper end of the electrode assembly 300.

Figure 5:
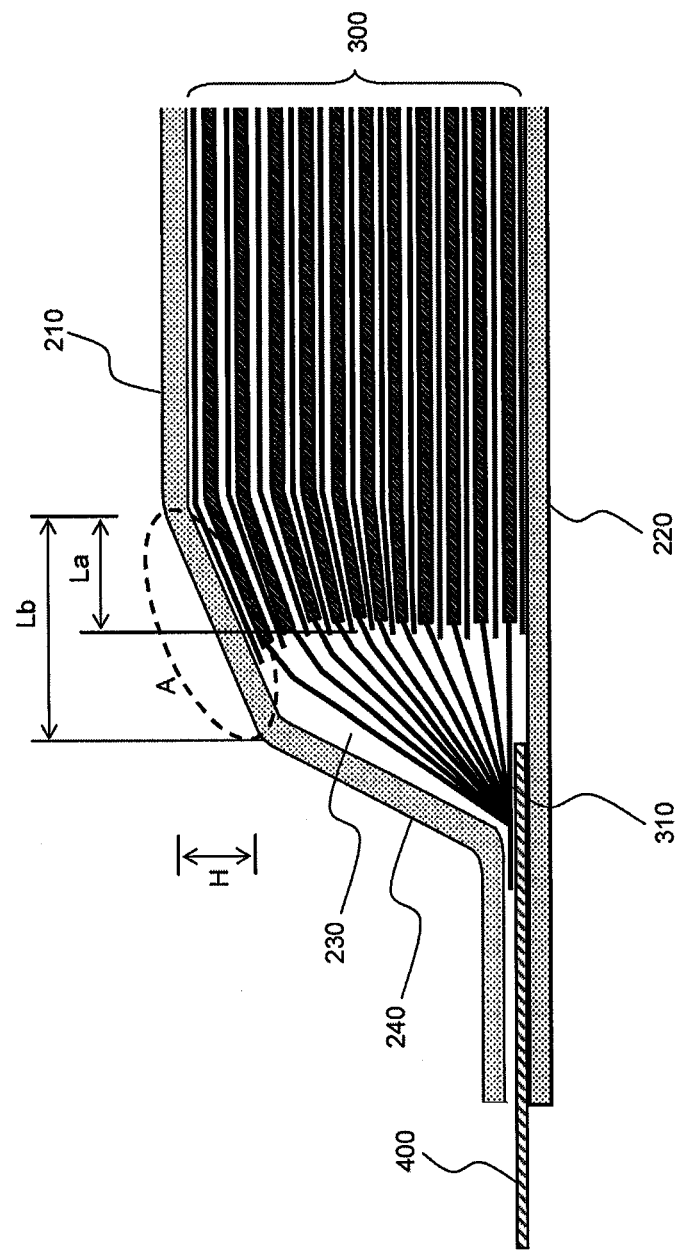
FIG. 5 is a partially enlarged view illustrating a multi-form region formed at a battery case of the secondary battery shown in FIG. 4.
Figure 6:
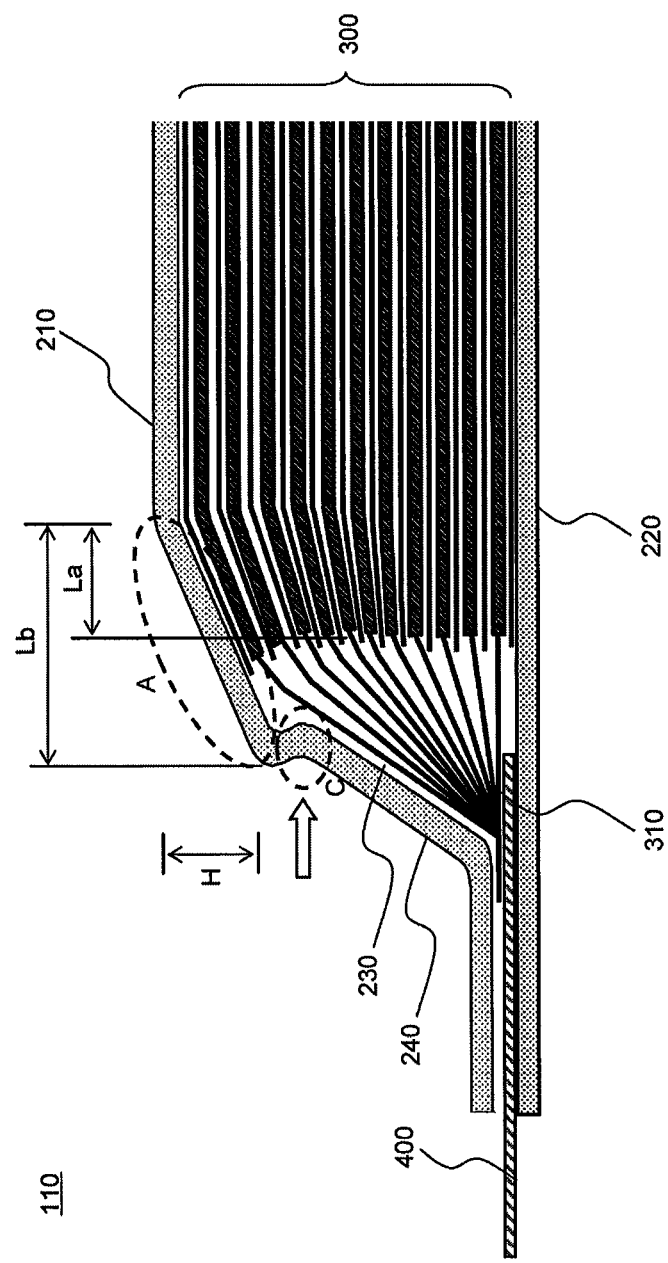
FIG. 6 is a partially enlarged view illustrating a multi-form region formed at a battery case according to another preferred embodiment of the present invention.

FIG. 5 is a sectional view, in part, typically illustrating the multi-form region formed at the battery case according to the above-described embodiment of the present invention, and FIG. 6 is a sectional view, in part, typically illustrating a multi-form region formed at a battery case according to another preferred embodiment of the present invention. For easy understanding, the space region between the upper end of the electrode assembly and the battery case is somewhat exaggeratingly shown.

Referring to these drawings, the secondary battery is constructed in a structure in which a receiving part 230 for receiving the electrode assembly 300 is formed in the battery case body 210, an inclined part 240 is formed at the space region between the receiving part 230 and the electrode assembly 300, located at the upper end of the receiving part 230, i.e., the upper end space region of the receiving part 230, such that the width of the inclined part 240 is at least partially decreased toward the upper end of the receiving part 230 (toward the electrode terminals), and a multi-form region A is formed such that the inclined part 240 is followed by the multi-form region A. Consequently, the secondary battery is constructed in a two-step inclination structure. The upper end of the electrode assembly 300 is pressed by the multi-form region A, whereby the electrode assembly 300 is fixed in position.

The multi-form region A starts from a position of the case body 210 spaced from the upper end of the electrode assembly 300 by a predetermined length $L_a$. The multi-form region A has a total length $L_b$. Also, the multi-form region A has a predetermined depth H from the outer surface of the battery case 210. Consequently, the size of the space region is minimized, and, even when a pressure is applied the multi-form region A, during the repetitive expansion and contraction of the electrode assembly by the repetitive charge and discharge of the battery, with the result that the battery case 210 expands, the upper end of the electrode assembly is effectively fixed by the expanded multi-form region A.

As shown in FIG. 6, the secondary battery 110 is constructed in a structure in which an inclined part 240 and a multi-form region A are formed at the upper end of the electrode assembly receiving part 230, formed in the battery case body 210, and the upper end surface of the electrode assembly receiving part 230 is bent toward the electrode assembly 300 to form a step region C. By the step region C, the space between the electrode assembly 300 and the battery case 200 is further decreased. Also, the connection part between the multi-form region A and the step region C protrudes, and therefore, the occurrence of a short circuit is prevented when impacts are applied to the upper end region, especially the corners, of the battery, due to the dropping of the secondary battery. The step region C may be formed manually or automatically by a machine.

Hereinafter, the present invention will be described in more detail with reference to the following examples. It should be noted, however, that these examples are provided only for illustrating the present invention and should not be construed as limiting the scope and spirit of the present invention.

Example 1

1-1. Manufacture of Cathode

A cathode mixture slurry was prepared by adding 94 weight percent of $LiCoO_2$ as a cathode active material, 3.5 weight percent of Super-P (a conducting agent), and 2.5 weight percent of PVdf (a coupling agent) to N-methyl-2-pyrrolidone (NMP) as a solvent. The cathode mixture slurry was coated on an aluminum foil. Subsequently, the cathode mixture slurry was dried and pressed to manufacture a cathode.

1-2. Manufacture of Anode

An anode mixture slurry was prepared by adding 94 weight percent of artificial graphite as an anode active material, 1 weight percent of Super-P (a conducting agent), and 5 weight percent of PVdf (a coupling agent) to NMP as a solvent. The anode mixture slurry was coated on a copper foil. Subsequently, the anode mixture slurry was dried and pressed to manufacture an anode.

1-3. Manufacture of Battery Case

A pouch-shaped battery case was manufactured from an aluminum laminate sheet, by a drawing process, such that the pouch-shaped battery case was provided with a receiving part having a multi-form region starting from a position spaced apart from the upper end of an electrode assembly by a length of 10 mm, as shown in FIG. 5.

1-4. Manufacture of Battery

A stacking type electrode assembly was manufactured in a structure in which the cathodes, manufactured as described in Paragraph 1-1, and the anodes, manufactured as described in Paragraph 1-2, were stacked while polypropylene separators manufactured by Celgard Inc. were disposed respectively between the cathodes and the anodes. The manufactured electrode assembly was mounted in the pouch-shaped battery case, and then an 1M $LiPF_6$ carbonate-based solution electrolyte was injected into the battery case, to manufacture a battery.

Example 2

A battery was manufactured in the same manner as Example 1 except that the upper end of the receiving part was bent toward the electrode assembly manually as shown in FIG. 6.

Comparative Example 1

A battery was manufactured in the same manner as Example 1 except that the multi-form region was not formed at the receiving part of the battery case.

Comparative Example 2

A battery was manufactured in the same manner as Example 1 except that the receiving part was formed in a structure in which the multi-form region started from a position corresponding to the upper end of the electrode assembly.

Experimental Example 1

Front dropping experiments were carried out on the pouch-shaped batteries manufactured according to Example 1, Example 2, Comparative example 1, and Comparative example 2. Specifically, the front dropping experiments were carried out on the pouch-shaped batteries after 50- and 100-cycle charge and discharge of the respective batteries. The experiment results are indicated in Table 1 below. The front dropping experiments were repeatedly carried out 10 times using 20 batteries for each example. In the front dropping experiments, the batteries were freely dropped from a height of 1.5 m such that the electrode terminals of the respective batteries were directed to the ground.

TABLE 1

|  | Number of short-circuited batteries in a full charge | Number of short-circuited batteries after 50 cycles | Number of short-circuited batteries after 100 cycles |
| --- | --- | --- | --- |
| Example 1 | 0 | 0 | 0 |
| Example 2 | 0 | 0 | 0 |
| Comparative example 1 | 12 | 15 | 19 |
| Comparative example 2 | 1 | 4 | 15 |

As can be seen from Table 1 above, the experiment results revealed that all the batteries manufactured according to Example 1 and Example 2, i.e., 20 batteries for each example, were not short-circuited after the front dropping experiments. Specifically, the space region of battery case receiving part, at the upper end of the electrode assembly, is minimized by the inclined part formed at the battery case receiving part, and, at the same time, the electrode assembly is pressed by the inclined part, whereby the movement of the electrode assembly is restrained, and therefore, the batteries were not short-circuited. On the other hand, the experiment results revealed that, for the batteries manufactured according to Comparative example 1, a large number of the batteries were short-circuited and caught fire. Also, the experiment results revealed that, for the batteries manufactured according to Comparative example 2, the number of batteries that were short-circuited due to the movement of the electrode assembly, when the batteries were dropped with the front end thereof down, was increased with the increase of the charge and discharge cycles of the batteries.

INDUSTRIAL APPLICABILITY

As apparent from the above description, the secondary battery according to the present invention is constructed in a structure in which the battery case is provided with the multi-form region, which presses the upper end of the electrode assembly by a predetermined width. Consequently, even when the gap between the battery case and the electrode assembly is increased due to the repetitive expansion and contraction of the battery case by the repetitive charge and discharge of the battery, it is possible to restrain the movement of the electrode assembly and thus to prevent the occurrence of a short circuit in the battery. As a result, the safety of the battery is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising:
a battery case having a case body and a cover, the battery case having a first section with the case body and cover spaced from one another, a second section having the case body and cover sealed to one another and a third section between the first and second sections;
an electrode assembly mounted between the case body and cover, the electrode assembly extending in the first and third sections; and
a plurality of electrode tabs in the third section, protruding from the electrode assembly, the electrode tabs connected to corresponding electrode leads,
wherein the third section comprises a multiform region and a receiving part, the multiform region extending from the first section and formed by a first planar portion of the case body extending from the first section toward the cover at a first angle of inclination, and the receiving part extending between the multiform region and the second section, the receiving part formed by a second planar portion of the case body extending from the first planar portion toward the cover at a second angle of inclination,
wherein the plurality of electrode tabs extend into the receiving part,
wherein the first angle of inclination is smaller than the second angle of inclination,
wherein the multiform region starts from a position corresponding to 5 to 15% of the total length of the electrode assembly from an upper end of the electrode assembly, and
wherein the upper end of the electrode assembly is bent toward an end of the multiform region by pressure applied by the multiform region.

2. The secondary battery according to claim 1, wherein the multi-form region starts from a position spaced apart from the upper end of the electrode assembly by 3 to 20 mm.

3. The secondary battery according to claim 1, wherein an upper end surface of the receiving part is bent toward the electrode assembly.

4. The secondary battery according to claim 1, wherein the receiving part is formed during the molding of the battery case.

5. The secondary battery according to claim 1, wherein the electrode assembly is constructed in a stacking or stacking/folding type structure.

6. The secondary battery according to claim 1, wherein the battery case is made of a laminate sheet including a resin layer and a metal layer.

7. The secondary battery according to claim 6, wherein the battery case is a pouch-shaped case made of an aluminum laminate sheet.

8. The secondary battery according to claim 1, wherein the battery is a lithium secondary battery.

9. A battery pack including a secondary battery according to claim 1.

10. The secondary battery according to claim 1, wherein the multi-form region is inclined.

11. A secondary battery comprising:
a battery case having a case body and a cover, the battery case having a first section with the case body and cover spaced from one another, a second section having the case body and cover sealed to one another and a third section between the first and second sections;
an electrode assembly mounted between the case body and cover, the electrode assembly extending in the first and third sections; and
a plurality of electrode tabs in the third section, protruding from the electrode assembly, the electrode tabs connected to corresponding electrode leads,
wherein the third section comprises:
a multiform region extending from the first section, the multiform region formed by the case body extending toward the cover at a first constant angle of inclination relative to the cover; and
a receiving part extending between the multiform region and the second section, the receiving part formed by the case body extending toward the cover at a second constant angle of inclination relative to the cover, the second angle of inclination being different than the first angle of inclination,
wherein the plurality of electrode tabs extend into the receiving part,
wherein the first angle of inclination is smaller than the second angle of inclination,
wherein the multiform region starts from a position corresponding to 5 to 15% of the total length of the electrode assembly from an upper end of the electrode assembly, and
wherein the upper end of the electrode assembly is bent toward an end of the multiform region by pressure applied by the multiform region.

* * * * *